Figure 1:
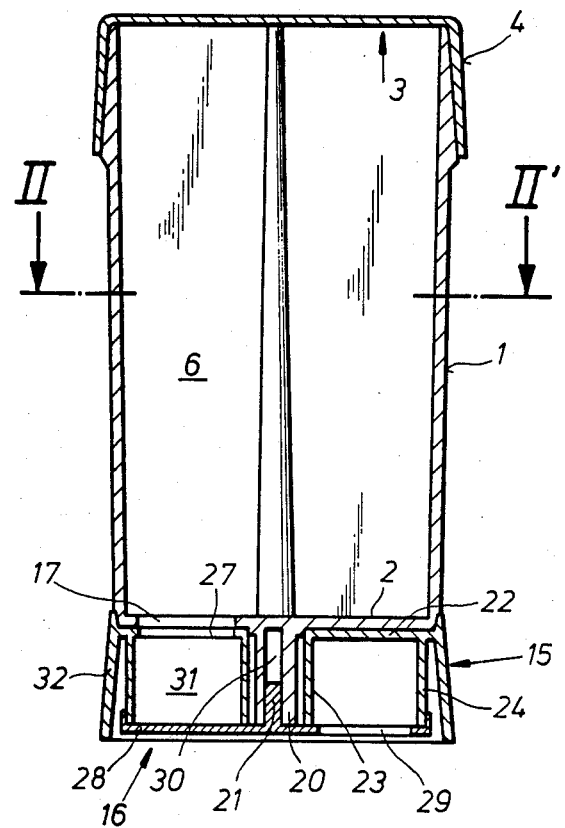

United States Patent [19]

Hofmann

[11] Patent Number: 4,691,821

[45] Date of Patent: Sep. 8, 1987

[54] RECEPTACLE WITH AT LEAST TWO CHAMBERS FOR ACCOMMODATING LIQUIDS AND PULVERIZED SUBSTANCE, ESPECIALLY COFFEE POWDER, MILK AND/OR SUGAR

[75] Inventor: Raimund Hofmann, Kreuzwertheim, Fed. Rep. of Germany

[73] Assignee: Jan Folkmar, Zurich, Switzerland

[21] Appl. No.: 818,530

[22] Filed: Jan. 13, 1986

[30] Foreign Application Priority Data

Jul. 29, 1985 [DE] Fed. Rep. of Germany ....... 3527124

[51] Int. Cl.⁴ .................. B65D 83/06; B65D 81/32
[52] U.S. Cl. .................................. 206/216; 206/229; 206/223; 220/253; 220/345; 220/22
[58] Field of Search ............... 206/219, 221, 229, 217, 206/222, 539, 533, 223, 534.2, 538; 220/253, 23, 336, 22, 345, 346

[56] References Cited

U.S. PATENT DOCUMENTS

| | | | |
|---|---|---|---|
| 2,780,349 | 2/1957 | Tornberg | 220/253 |
| 2,794,545 | 6/1957 | Olson | 206/217 |
| 3,278,014 | 10/1966 | Thornton | 206/219 |
| 3,326,363 | 6/1967 | Bennett et al. | 206/219 |
| 3,743,520 | 7/1973 | Croner | 220/23 |
| 3,796,813 | 3/1974 | Kurland | 206/217 |
| 3,860,111 | 1/1975 | Thompson | 220/253 |
| 4,163,496 | 8/1979 | Dogliotti | 206/538 |
| 4,288,006 | 9/1981 | Clover, Jr. | 206/534 |
| 4,572,376 | 2/1986 | Wrennall | 220/253 |
| 4,583,667 | 4/1986 | Fishman et al. | 206/538 |

FOREIGN PATENT DOCUMENTS

| | | | |
|---|---|---|---|
| 76224 | 4/1983 | European Pat. Off. | 206/222 |
| 1071628 | 6/1967 | United Kingdom | 220/253 |

*Primary Examiner*—Stephen Marcus
*Assistant Examiner*—Brenda J. Ehrhardt
*Attorney, Agent, or Firm*—Townsend and Townsend

[57] ABSTRACT

A receptacle with several chambers which are basically arranged side by side. On the face side of this receptacle a proportioning device is provided. This proportioning device is basically determined by a chamber, which has a predetermined volume. In an embodiment the chamber can be moved between a filling position and an extraction position. This movement is executed in relation to the receptacle. In an additional embodiment the chamber is brought in connection with one of the other chambers via the filling hole by means of a disc. By operating the disc the filling hole can be closed and by operating an additional disc an extraction hole to the chamber can be opened. At the receptacle's side which is facing opposite to the proportioning device additional openings are provided. These openings can be closed by a cover or a similar device. In an additional embodiment the openings are provided in the vicinity of the other face side, according to the circumference, and they can be closed by means of a set ring.

9 Claims, 11 Drawing Figures

RECEPTACLE WITH AT LEAST TWO CHAMBERS FOR ACCOMMODATING LIQUIDS AND PULVERIZED SUBSTANCE, ESPECIALLY COFFEE POWDER, MILK AND/OR SUGAR

This invention relates to a receptacle with at least two chambers for accommodating liquids and pulverized substances, especially coffee powder, milk and/or sugar.

Receptacles are known which contain several chambers for accommodating pulverized substances. In this case the pulverized substances can be taken from the receptacle by means of output openings being situated at the upper front side.

It is the object of this invention to create a receptacle, according to the preamble clause of claim 1, which enables a measured extraction of at least one of the substances.

In accordance with this invention the object is achieved by the means which are stated in the characterizing part of claim 1.

This invention creates a receptacle at which a proportioning device is attached to one of both face sides, that is, at the upper or lower face side of the receptacle. The proportioning device may be connected with one of the receptacle chambers by means of an filling hole. In this way the pulverized substance, such as, water-soluble coffee powder which is usually kept in one of the chambers, can be taken from the receptacle in measured portions, whereas the other chambers simultaneously contain the necessary ingredients for coffee, such as, milk and/or sugar.

In one embodiment the proportioning device is situated in an attachment, which is fixed to the lower face side of the receptacle and which contains the proportioning device in the shape of a chamber. In general the proportioning device consists of a disc, which is adopted to the basic shape of the receptacle, with two concentric ring flanges. In this case two side walls between the ring flanges determine a roughly triangular chamber of the proportioning device. The lower part of the chamber is open and if the receptacle is assembeled with the proportioning device this part is covered by an additional part, such as, an additional disc or the bottom of the attachment or a similar part. In the ring flanges supporting disc an opening to the chamber is provided, which can be matched with an filling hole. In this case the filling hole in the bottom of the receptacle is designed in such a way that it enables access between proportioning device and one of the receptacle's chambers.

In one embodiment it is provided that the chamber together with the attachment can be rotated against the receptacle. In an altered embodiment the attachment serves as a guiding mechanism and/or housing for the chamber of the proportioning device. In this case the chamber is arranged in such a way that it can be moved within the attachment or that it can be rotated around the receptacle axis. In an additional embodiment it is provided that the chamber of the proportioning device is stationary in relation to the receptacle and that it is accommodated within the attachment. The filling of the chamber of the proportioning device is achieved by a disc, which is pivoted between the chamber of the proportioning device and the receptacle. This disc is brought in such a position that an opening in the rotating disc matches with the receptacle's filling hole and the chamber of the proportioning device. At the side of the chamber of the proportioning device which is on the facing opposite side to this disc, an additional disc with an opening is provided. This disc closes the chamber at the lower part or in order to take the substance out of the chamber of the proportioning device it can be rotated to such an extent that its opening releases the chamber at the lower part. Basically all chambers in the receptacle are arranged side by side and the number of chambers is variable, e.g., two, three or more chambers can be provided. The provision for three chambers is of special advantage, that is, a chamber for water-soluble coffee powder, a chamber for sugar, and a chamber for milk or milk powder. The chambers containing sugar and milk are provided with attachments, hinged covers or similar closeable openings, which are situated at the receptacle's side that is facing opposite to the proportioning device. This embodiment enables that the substance to be proportioned is released in a measured quantity at the lower side of the receptacle, whereas the substance not to be proportioned can be taken out of the receptacle at the upper side by tilting the receptacle. In the case of an other advantageous embodiment the substance to be proportioned can be taken out of the receptacle at the upper part by tipping the receptacle, whereas the openings for milk and/or sugar are, according to the receptacle's circumference, also provided at the upper face side and they can be closed by means of a rotary ring.

In the case of the embodiment where the proportioning device is situated at the lower face side of the receptacle, a tipping of the receptacle in order to take out the substance to be measured is not necessary if the extraction opening is provided at the lower face side of the attachment, which is facing opposite to the receptacle.

Thus, this invention creates a receptacle for accommodating several substances, especially liquids or/and pulverized substances. This receptacle enables the proportioned output of at least one of the substances in a simple way, whereas the other substances with not measurable volumes can be taken out of the receptacle. The receptacle is especially suitable for accommodating water-soluble coffee powder and the ingredients, such as, milk and sugar. The size of the chamber of the proportioning device is designed in such a way that the accommodated volume corresponds with the quantity of one cup of coffee.

For explanatory reasons, additional elements of preferred embodiments of the receptacle are described by means of illustrations on the following pages.

Figure 2A:
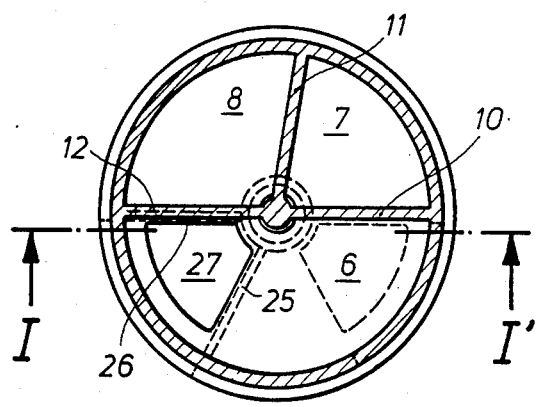
Figure 2B:
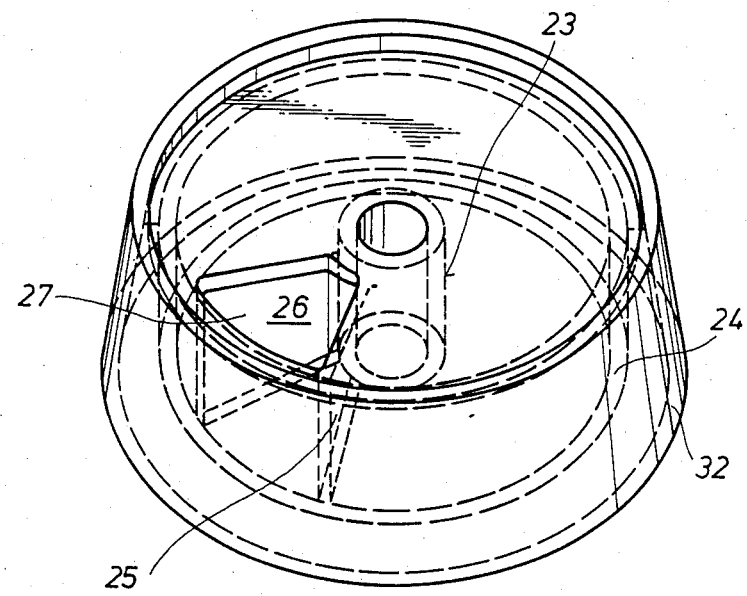

FIG. 1 a sectional view of a first embodiment of the receptacle along the line I—I' of FIG. 2.

FIG. 2a,b a plan view on the receptacle according to FIG. 1 along the line II—II' and on the proportioning device.

Figure 3:
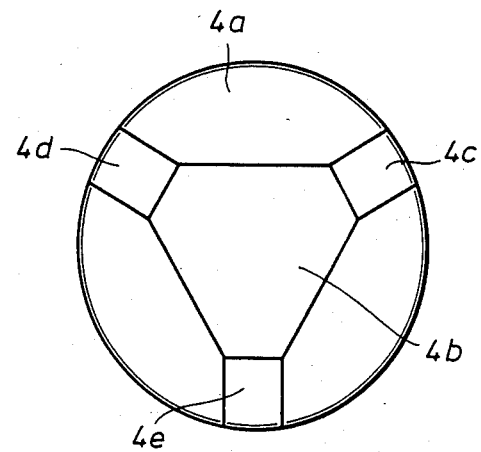

FIG. 3 illustration of a preferred cover.

Figure 4:
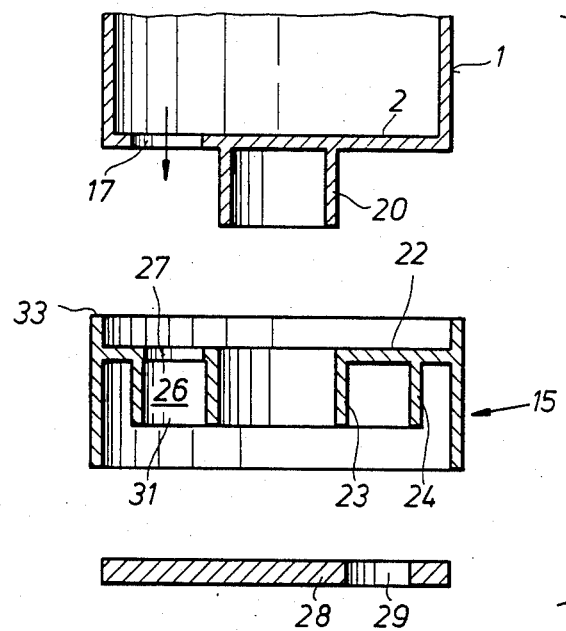

FIG. 4 an extended illustration of an altered embodiment of the receptacle as compared to FIG. 1.

Figure 5:
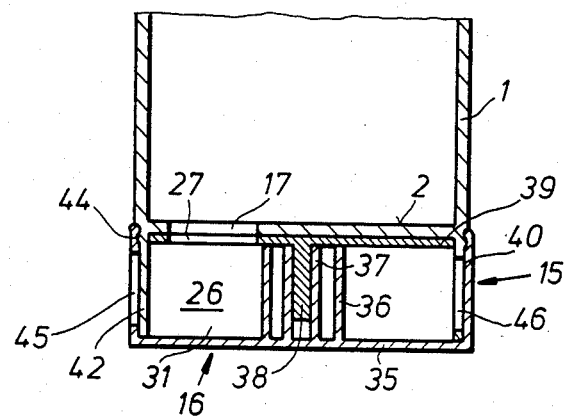

FIG. 5 a further altered embodiment of the receptacle with proportioning device.

Figure 6:
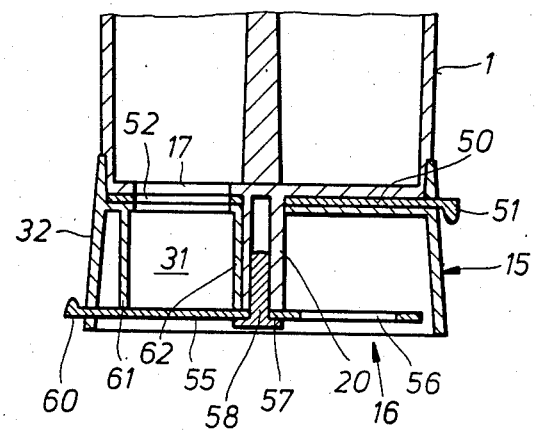
Figure 7:
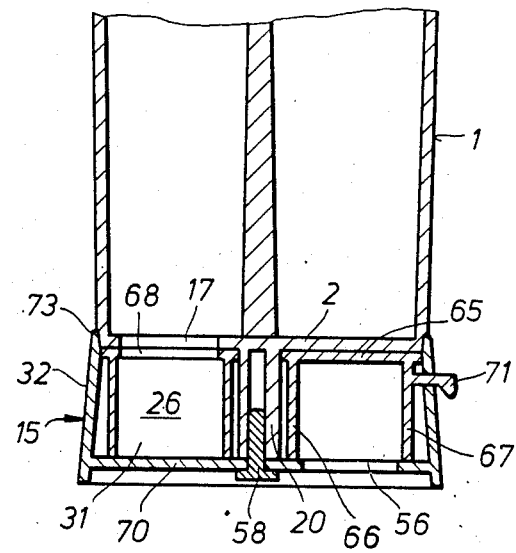

FIGS. 6 and 7 further embodiments of a receptacle at which the proportioning device is provied at the lower face side of the receptacle.

Figure 8:
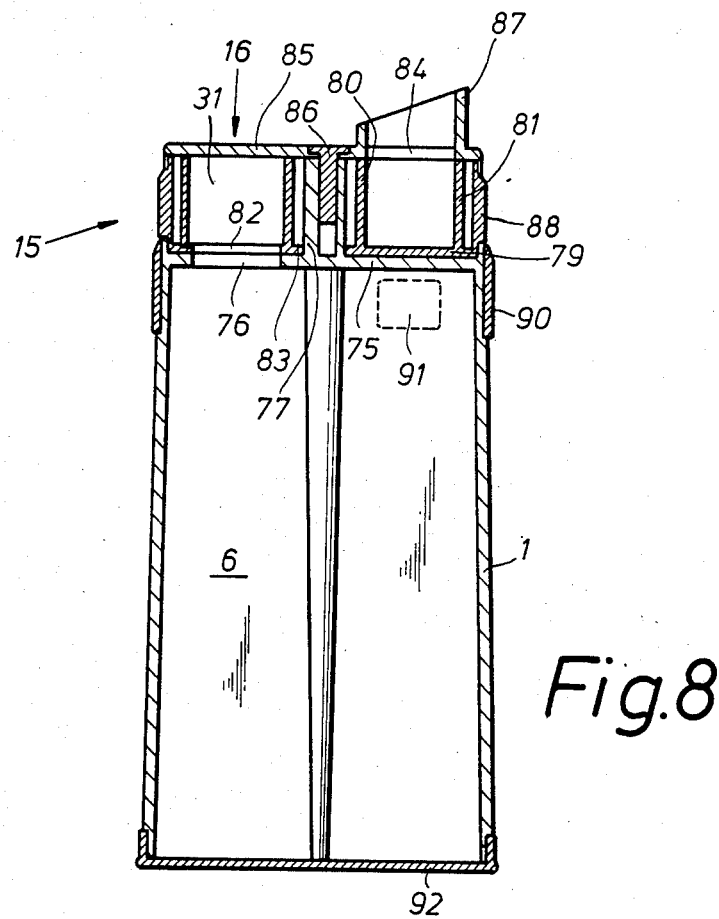

FIG. 8 a receptacle at which the proportioning device is provided at the upper face side.

Figure 9:
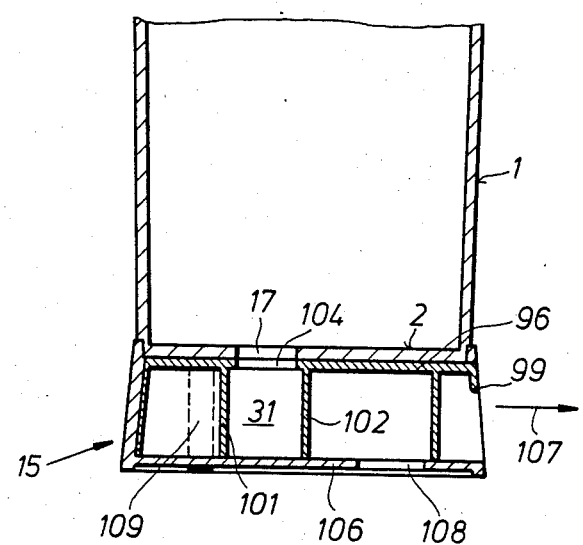
Figure 10:
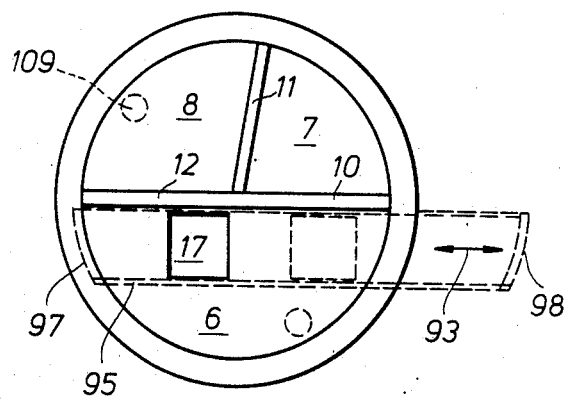

FIG. 9 and 10 a further altered embodiment of a receptacle with proportioning device at which the proportioning device can be moved in a direction which is vertical to the receptacle's axis.

FIG. 1 shows in partial view a first embodiment of a receptacle for accommodating pulverized substances and liquids, mainly coffee powder, sugar and milk powder. FIG. 1 is a sectional view along the line I—I' of FIG. 2. In FIG. 1 the receptacle is designated as 1 and is chiefly of cylindrical shape. The receptacle 1 is provided with a bottom 2. On the face side 3, that is opposite to bottom 2, the receptacle is closed with a cover 4. In this case the cover 4 is provided with openings, which, according to FIG. 3, can be closed by means of hinged covers. According to FIG. 3 the cover consists of a known basic cover 4a and, for the most part, a star-shaped plastic part 4b is inserted in its indentation. This part is attached to the basic cover 4a. This star-shaped plastic part 4b is provided with several hinged covers 4c, 4d, 4e, which are attached to the central plastic part by means of a hinge. These kind of covers are known. The openings and/or the respective hinged covers 4c, 4d, 4e are provided to the cover 4 in such a way that there is access to the chambers, such as, chamber 6, 7, 8, (FIG. 2). In this case the hinged cover for chamber 6 covers a larger opening, which is used for filling chamber 6, preferably with coffee powder.

As shown in FIG. 2, the chambers 6, 7, 8 are separated from each other by respective walls 10, 11, 12.

At the lower part of the receptacle, that is, at the lower face side of the receptacle, which is determined by the bottom 2, a preferable ring-shaped attachment is provided, which serves for accommodating a proportioning device 16. The basic principle of the proportioning device is that by means of an opening the proportioning device 16 can be filled with a pulverized substance, such as coffee powder, from chamber 6. This object is achieved by an opening 17, hereinafter called filling hole, which is provided in the bottom 2. The proportioning device mainly consists of a chamber with side walls—which still have to be described—predetermined width and height by means of which the volume of the proportioning device 16 is determined. After the proportioning device 16 has been filled the filling hole 17 is to be closed, this step still has to be described, whereas the coffee powder in the proportioning device can be taken from the proportioning device 16 through an extraction hole. Thus it is possible to take coffee powder, which is accommodated in the chamber 6, out of the receptacle 1 respectively with a predetermined volume and/or predetermined quantity. In this case the volume of the proportioning device 16 is, e.g., predetermined in such a way that the coffee powder quantity in the proportioning device corresponds with the quantity that is required for a cup of coffee. In this case the coffee powder is soluble in hot water.

Other ingredients, such as, sugar and milk powder are taken from the chambers 8 and/or 7 via the already mentioned upper openings. The chambers 6, 7, 8 are designed in such a size that they meet the requirements of an ordinarily expected consumption ratio, that is, the coffee powder chamber 6 has the largest volume, the sugar chamber 8 and the milk chamber 7 have a respectively smaller volume.

In the below description the embodiment shown in FIG. 1 is described in detail. The attachment 15, which simultaneously serves as base area for the receptacle 1, is ring-shaped and it is attached to the lower face side of receptacle 1 in such a way that a rotary motion is possible. Approximately in the centre a ring-shaped projecting part 20 is provided at the lower face side of the receptacle 1. This projecting part serves as a matching part for journal 21. The cross section of attachment 15 shows its slight conical shape. Attachment 15 also consists of a wall 22, which runs parallel to bottom 2. This wall supports a central, ring-shaped flange 23. A ring-shaped flange 24 is attached to the wall 22, which is situated beside bottom 2. In this way both flanges 23, 24 are essentially concentric to each other and from wall 22 and they point in downward direction and they determine a ring-shaped room, which is divided by the two wall sections 25, 26, which run between the two ring-shaped flanges 23, 24 radially to the axis of receptacle 1. The wall sections 25, 26 are dash lined in FIG. 2. The wall sections 25, 26 as well as the ring-shaped flanges 23, 24 and wall 22 define, in the form of a chamber, the proportioning device 16. In this case an opening 27 is provided between the both wall sections 25, 26 of wall 22. This opening 27 usually corresponds with the size of the filling hole 17. The lower side of this chamber as well as of the respective part of the ring room, which is defined by the two ring flanges, is open and is to be closed by means of a cover 28, which slightly overlaps the ring-shaped flanges 23, 24, and, according to FIG. 2, is provided with an opening 29 that is used for emptying the chamber. The journal 21 is a projecting part of the cover 28. This journal is an integral part of cover 28. After insertion of the journal 21 into the opening 30, which is determined by the projecting part 20, the journal 21 is attached to the projecting part 20 in such a way that it cannot be rotated. The journal 21 supports the attachment 15 at the lower face area of the receptacle 1 to such an extent that attachment 15 can be rotated around the axis of receptacle 1. Thus, chamber 31, which is shown in FIG. 1 in the illustration of attachment 15, can be filled with coffee powder via the filling opening 17. For this purpose attachment 15 is rotated around a predetermined angle up to the point at which chamber 31 stops over the opening 27, which is provided at cover 28. In this way an emptying of chamber 31 is possible. The openings 27, 29 are respectively situated between the two ring flanges 16, 23 (FIG. 1, 2). The flanges 23, 24 of wall 22 have not to be, as illustrated, in an angle of 90° to the wall 22 but they can also be slightly inclined. The inclined ring area 32, which is attached to wall 22, is mainly for optical reasons and can be, if necessary, omitted.

In order to simplify the selection of the two rotary positions, at which the chamber 31 is filled and emptied, it can be advantageous to provide appropriate stops. Rotation of the attachment between the filling and emptying position of attachment 15 is limited by these stops. These stops are not shown in FIGS. 1 and 2. As shown in FIG. 1, the height of attachment 15 is smaller than the height of receptacle 1. The height of the flanges 23, 24 approximately corresponds with the height of the cylindrical projecting part 20.

FIG. 4 shows an altered embodiment as compared to the embodiment shown in FIG. 1. In this embodiment a projecting part 20 in the shape of a ring-shaped flange is provided at the lower face side of receptacle 1, roughly centrical to bottom 2. Attachment 15 is provided with a wall 22, which is facing receptacle 1. This wall is provided with concentrical ring flanges 23, 24. Wall 22 is provided with an opening 27, open to the upward direction, which is situated in the area of chamber 31. Attachment 15 is attached to flange 20 and analogous to the embodiment in FIG. 1 and it is pivoted against the receptacle and/or its bottom 2 as soon as the attachment 15 is attached to receptacle 1 from the lower direction. This pivoting is achieved by a ring flange 33, which points slightly in an upward direction, that is, in the direction of receptacle 1. A cover 28 with an opening 29 serves as fixture. This cover is fitted to, e.g. by welding, the flange 20. It is obvious that the fixtures for the cover 28 of the embodiments in FIGS. 1 and 4 have to be selected in such a way that there is enough clearance in order that attachment 15 can be rotated between cover 28 and bottom 2. In the assembeled embodiment according to FIG. 4 the cover 28, in the vicinity of the downward areas of flange 20, is welded at flange 20, so that these two parts form an integral part. By rotating the attachment 15 between filling hole and extraction opening, the extraction of an proportioned volume of coffee powder, via the openings 17, 27, from chamber 6 is ensured. Thus, a proportioned extraction is also achieved. After this step the proportioned volume in chamber 31 can again be extracted via the opening 29 by rotating attachment 15. As in the above-described embodiment, the rotary movement of attachment 15 can also be limited by appropriate stops. The disc-shaped cover 28 in FIG. 4 has a smaller diameter than attachment 15, similar to the embodiment shown in FIG. 1. Refering to FIG. 5 a further embodiment is described.

FIG. 5 shows a partial view according to FIGS. 1 and 2 and it also shows a receptacle 1 with a bottom 2 which is, as already described, provided with an opening 17. In this embodiment the attachment 15 consists of a ring-shaped part with a bottom 35. Vertical to bottom 35 ring-shaped flanges 36, 37, which point in the upper direction, are provided. In this case the flanges 36, 37 are concentrical to each other and flange 37 forms a clamp tube, in which a journal 38 is inserted. This journal is held in its position by pinching forces and/or it cannot be rotated. It supports a circle-shaped plate or disc 39. Flange 36 limits chamber 31 against the receptacle axis and it corresponds to the inner flange 23 in FIG.1. Of all walls, which determine the sides of chamber 31, only wall 26 can be seen in FIG. 1. The shape of attachment 15 is equivalent to the shape of a reversed cover. The ends of wall section 40, which is vertical to bottom 35, snaps into the ring-shaped groove 44, which is provided in the receptacle 1 approximately at the height of bottom 2. The lower face side, which is defined by bottom 2, of receptacle 1 is provided with a ring flange 42, that points in a downward direction. The height of this ring flange approximately corresponds with the height of wall section 40. By the snapping of the ends of wall section 40 into the ring groove 44 the attachment 15 is pivoted at the lower part of receptacle 1 and supports plate 39 in such a way that it cannot be rotated. Opening 27 in plate 39 enables the filling of chamber 31. For this purpose the opening has to be brought into such a position that it matches filling hole 17. The pulverized substance in chamber 6 is brought into chamber 31 via the openings 17, 27. The volume of chamber 31 is determined by a section of bottom 35, a section of the flanges 42, 36 and the walls 25, 26. If attachment 15 is rotated in such a way that a side-opening 45 of attachment 15 matches a side-opening 46 in the ring flange 42, the content in chamber 31 can be emptied by tilting the entire receptacle 1. All embodiments in FIGS. 1 to 5 have one feature in common, that is, a rotation of attachment 15 from the position shown in FIGS. 1, 4 and 5 closes the filling hole 17 by means of the wall 22 and/or plate 36.

In an additional altered embodiment, which is shown in FIG. 6, the attachement 15 is situated at the lower face side receptacle 1 and cannot be rotated. This attachment is provided with a chamber 31, which determines the proportioning device 16. This chamber is a part of attachment 15 and thus, in contrast to the above-mentioned embodiments, it is provided in a stationary position at the lower side of receptacle 1. The chamber 31 is filled by means of a rotating disc 50 which is arranged between attachment 15 and receptacle 1 and which can be operated by means of a lever 51 or a similar device, that is situated in a slot 52 diagonal to the receptacle's axis. The disc 50 is provided with an opening 52 that can be matched with opening 17. This disc is locked by stops, as shown in FIG. 6, in order to fill chamber 31 and in the position, which is not shown, in which the disc 50 closes the opening 17 from downward direction. The disc is guided by a central opening which is, as shown in FIG. 1, supported by the tube-shaped part 20 of the receptacle 1. Below chamber 31 an additional, rotating disc 55 is attached and it is provided with an extraction hole 56 as well as a central opening 57. According to FIG. 6 the disc 55 is, as seen from the lower direction, adjacent to tube 20 and is pivoted against tube 20 by a clamp journal 58 or a similar device. A groove or a slot in attachment 15 enables a rotation of disc 55. Disc 55 is rotated by means of an operational device 60. As it was the case in the above described embodiments, chamber 31 consists of side walls 25, 26 which determine the proportioning volume together with ring flange parts 61, 62, that in this embodiment are provided at attachment 15, and the two discs 50, 55 determine the volume.

In order to fill chamber 31 the upper disc is rotated to such an extent that its opening 52 matches the filling hole 17. Thus, the pulverized substance is transferred to chamber 31. After the filling hole is closd by rotating the disc 50, in order to empty chamber 31 the lower disc has to be rotated to such an extent that its opening matches chamber 31.

In the case of the embodiment which is shown in FIG. 7 an attachment 15 is pivoted by means of a fixing journal 58 at the lower side of receptacle 1. In this attachment the journal 58 clamps into the projecting part 20, which serves as clamp tube, in the same way as it is provided for the embodiment in FIG. 6. Thus the journal 58 supports the attachment 15 at the lower side of receptacle 1. A rotating part is situated between attachment 15 and bottom 2 of the receptacle 1. This part consists of a disc or plate 65 at which, according to FIG. 7, ring flanges 66, 67 are provided, which point in downward direction and are eccentric to each other. The illustration in FIG. 7 shows the disc 65 with its opening roughly matching the entrance hole 17 of receptacle 1. In this case chamber 31 is provided with side walls 25, 26 which are attached to the disc 65. In the embodiment according to FIG. 7, the bottom of chamber 31 is determined by the bottom of attachment 15, which is designated as 70. By moving a operating device 71, which is in a fixed connection with the ring flange 67 and which can be moved along a groove or a slot in attachment 15, the chamber 31 is rotated around the axis of receptacle 1 within attachment 15 until the chamber matches the opening 56 in bottom 70. Thus the substance in chamber 31 is emptied. In order to enable a guiding mechanism, the disc 65 is provided with a central opening or tube, through which the tube part 20, in assembled condition according to FIG. 7, can be passed. The proportioning device, which is basically determined by the disc 65 with the attached ring flanges 66, 67, is fitted on tube 20. Afterwards the attachment 15 is attached. In order to form a closing part with receptacle 1 the cross section of attachment 15 shows a slight conical form. In this way an end area 73, which points in upward direction, is in arrangement with the outside walls of receptacle 1. The support of attachement 15 and the part 65, 66, 67 on the receptacle, which is pivoted between bottom 70 and bottom 2, is ensured by journal 58.

FIG. 8 shows an additional, altered embodiment of a receptacle 1 with a proportioning device. In this embodiment the proportioning device 16 is situated at the upper face side of receptacle 1. In order to accommodate proportioning device 16 receptacle 1 is at its upper face side provided with a wall 75, which basically closes the upper side, and which is provided with an opening 76 that leads to a chamber. At the wall 75, pointing in upward direction approximately in the centre, a tube-shape part 77 is provided, which projects in upward direction and that serves as a matching part for the fastening journal 86. This part 77 basically corresponds with, e.g., the projecting part 20 in FIG. 1. A disc 79 is attached to face wall 75. This disc supports the ring flanges 80, 81, which point in upward direction. This disc is similar to the part 65, 66, 67 which are described in FIG. 7. The disc 79 is provided with an opening 82, which leads to the chamber 31. In this case chamber 31 is defined by the side walls 25, 26 and the already mentioned ring flanges 80, 81. In addition the disc 79 is provided with a central opening 83 and thus it can be attached to the tube-shaped part 77. After fitting the disc 79, a circle-shaped plate 85 is attached, which serves as a fixed cover. This plate is fixed to the receptacle 1 by means of a journal 86. In this case the journal 86 is inserted by pinching it into the tube-shaped part 77. The plate or the cover 85 can preferably be provided with a pipe section 87, which serves as pouring device. By a rotating ring 88, which is attached to the disc 79, concentrical to the ring flanges 80, 81, the chamber 31 can be rotated to a position at which the opening 82 matches the opening 76, and to a second position at which the chamber is connected to the opening 84 of the pouring device 87. By tilting receptacle 1 the chamber 31 can be filled, in the position as shown in FIG. 8. Afterwards the substance in chamber 31 can be poured out via the pouring device 87 by rotating the rotating ring 88 and by a renewed tilting of the receptacle. An additional rotating ring 90 is situated at the outer circumference of receptacle 1, below rotating ring 88. This ring 90 enables the closing of at least one spray opening 91, which is provided at the side of receptacle 1 and which leads to one of the other chambers. At the receptacle's side 1, which is facing opposite to the proportioning device 16, a removeable cover 92 is provided, which enables a refilling of all chambers within receptacle 1.

FIGS. 9 and 10 show an additional embodiment of the receptacle with proportioning device. Receptacle 1, as described in FIG. 1, is closed at its lower side by a bottom 2, which is provided with an filling hole 17 that leads to chamber 6 of receptacle 1. FIG. 10 shows a diagrammatic plan view and it also shows the filling hole 17, which is provided in the area of chamber 6. In this case FIG. 10 shows the position at which the chamber 31 is filled, whereas the position is shown in dashed lines at which the chamber 31 is emptied.

Instead of a rotating part, as it is described in FIGS. 1 to 8, the embodiment in FIGS. 9 and 10 is provided with a shifting proportioning device, which can be relocated along an arrow 93, that is, vertical to the axis of the receptacle. This embodiment basically applies the functioning principle of a "drawer". The part, which determines the proportioning device, is guided in the attachment 15 by a basically straight wall, which is a prolongation, in the downward direction, of the wall sections 10, 12 on the surface side and/or bottom 2, which determine the chamber. It is also guided by an additional straight wall, which is shown in FIG. 10 in dashed lines. The proportioning device consists of a stripe-shaped, upper part 96, which is, according to FIG. 10, located at the bended face areas 97, 98, which are attached to form of the receptacle and/or attachment 15. On the one hand the bended and/or rounded face areas 97, 98 ensure a complete insertion of part 96 up to the side wall of attachment 15 and on the other hand a closing part in the area of a handle 99 on face area 98 is achieved. This part is adapted to the shape of the receptacle and/or attachment. Four walls, which point in downward direction, are provided at part 96. In FIG.9 the two walls 101, 102, which are parallel to each other, are shown. These walls together with the two other side walls determine chamber 31 of the proportioning device. By means of an opening 104 in part 96, chamber 31 can be filled via the opening 17, which is shown in the respective position in FIG. 9. In this case the lower edges of the walls 101, 102 are supported on bottom 106 in such a way that they can be guided along. Bottom 106 is a part of attachment 15. By extracting part 96, in the direction of arrow 107 as shown in FIG. 9, chamber 31 can be repositioned to such an extent that it matches an opening 108 in bottom 106 of attachment 15, thus, chamber 31 can be emptied. Fastening devices 109, which are shown in dash-pointed lines in FIG. 9, serve as fastening devices for attachment 15.

Thus the proportioning device and/or its chamber 31 of the embodiment, which is shown in FIGS. 9 and 10, can be shifted between receptacle 1 and attachment 19.

In the case of all above mentioned embodiments, the proportioning device can be connected with a chamber, which is provided in receptacle 1, via a filling hole or it can be connected with the extraction opening of the chamber. In the latter case the extraction opening of chamber 31 is provided at the lower side or at the side of attachment 15. In the embodiments, according to FIG. 1 to 7 and 9, the openings, which enable access to the other chambers 7, 8, are provided at the side of receptacle 1, which are opposite to attachment 15. These openings can be closed by hinged covers or a similar device, as described in FIG.3. Instead of three chambers also more or fewer chambers can be provided in receptacle 1. In order to ensure a sufficient sealing especially between the proportioning device, the receptacle, bottom 2 and the attachment additional sealing grooves and/or sealing slots can be provided. In order to simplify this description, these sealing devices were not described.

This invention creates a receptacle for liquids and pulverized substances, which enables the extraction of at least one of these substances and/or liquids, preferably a pulverized substance, whereas the other substances can be taken out in unmeasured portions via closable openings. In order to accommodate several, different substances, the receptacle is subdivided into two, three or several chambers, of which one can be connected to the proportioning device via an filling hole. In all embodiments, the proportioning device is provided within the attachment, which is fitted to the face side of the receptacle, as an additional part of the housing. This attachment accommodates a chamber, which determines the quantity to be measured by its volume. This chamber can be moved between a filling position and an extraction position or for filling purposes it can be brought in connection with the respective chamber by means of an operational device. In this case the filling hole is closed by the operational device and the extraction opening is opened by an additional operational device. The chambers of the receptacle are basically arranged side by side and they are separated by separating walls, which run through the receptacle. The diameter of attachment 15 basically corresponds with the diameter of receptacle 1; the height of the proportioning device corresponds with the height of attachment 15, as shown in the illustration. In this case the tolerances, which are necessary for the movements of the proportioning device 16 and/or attachment 15 against the receptacle 1, have to be adhered to.

Except the embodiment shown in FIGS. 9 and 10, the proportioning device basically consists of a disc-shaped plate 22, 35, 65, 79, which supports at least two ring flanges 23, 24, 36, 42, 66, 67, 80, 81, which are concentrical to each other and which are projecting from the plate. The chamber is determined by these ring flanges and by the wall sections 25, 26, which are arranged between the ring flanges and which are open at one side, that is, in upward or downward direction.

According to these descriptions, the filling holes, which are situated in the bottom of the receptacle or in the proportioning device, have approximately the equivalent radius to the receptacle axis and they are of approximately the same size. An additional part in the shape of a disc and/or cover 28, 39, 85, or a part 70 of attachment 15 serves as closing part for the ring room side, which is facing opposite to the filling hole. This part is provided with an extraction opening which is directed to the lower part or to the side. The diameter of outer ring flange, except the embodiment shown in FIG. 5, has a smaller diameter than the diameter of the receptacle. This outer ring flange is surrounded by a circle-shaped wall, which serves as a rotating ring. If necessary, the circle-shaped wall can be omitted.

Although, according to the invention and as stated above, the receptacle should be used for accommodating pulverized substances and liquids, it is preferably, exclusively used for accommodating pulverized substances especially coffee powder, milk powder, sugar or a similar substance.

I claim:

1. Apparatus for retaining substances in the form of a liquid or pulverized solid and for delivering portions of one of said substance of preselected volume, said apparatus comprising:
    a receptacle of cylindrical shape with at least two compartments;
    a chamber of said preselected volume being arranged on one end of said receptacle and having a chamber opening;
    a ring-shaped operating member being arranged at said one end of said receptacle and defining said chamber of said preselected volume within the reing-shaped operating member, and being rotationally mounted on said one end of said receptacle;
    said chamber being movable together with said operating member between a first position providing a passage communication with one of said compartments of the receptacle, and a second position closing said passage and opening said chamber to the atmosphere;
    a cover secured to said receptacle and being arranged on the side of said receptacle opposing to said operating member; and
    a closure of sufficient size to seal said chamber opening against the armosphere when the chamber is not in the second position;
    further comprising an opening in said receptacle and an opening in said closure, and in which said chamber contains a first opening communicating with said receptacle opening when said chamber is in said first position, and a second opening communicating with said closure opening when said chamber is in said second position.

2. Apparatus in accordance with claim 1 in which said one end of the receptacle comprises a ring-shaped projecting part for rotatably mounting said operating member.

3. Apparatus for retaining substances in the form of a liquid or pulverized solid for delivering portions of one of said substances of preselected volume, said apparatus comprising:
    a receptacle of cylindrical shape with at least two compartments;
    a chamber of said preselected volume being arranged on one end of said receptacle and having a chamber opening;
    a ring-shpaed operating member being arranged at said one end of said receptacle and defining said chamber of said preselected volume within the ring-shaped operating member, and being rotationally mounted on said one end of said receptacle;
    said chamber being movable together with the operating member between a first position providing a passage communicating with one of said compartments of the receptacle, and a second position closing said passage ahd opening said chamber to the atmosphere;
    a cover secured to said receptacle and being arranged on the side of said receptacle opposing to said operating member; and
    a closure of sufficient size to seal said chamber opening against the atmosphere when the chamber is not in the second position;
    further comprising an opening in said receptacle and an opening in said closure, and in which said chamber contains a first opening communicating with said receptacle opening when said chamber is in said first position, and a second opening communicating with said closure opening when said chamber is in said second position;
    wherein said one end of the receptacle comprises a ring-shaped projecting part for rotatably mounting said operating member.

4. Apparatus in accordance with claim 1 or 3 in which said operating member comprises two concentric walls for defining said chamber.

5. Apparatus for retaining substances in the form of a liquid or pulverized solid and for delivering portions of one of said substances of preselected volume, said apparatus comprising:

a receptacle of cylindrical shape with at least two compartments;

a chamber of said preselected volume being arranged on one end of said receptacle and having a chamber opening;

a ring-shaped operating member being arranged at said one end of said receptacle and defining said chamber of said preselected volume within the ring-shaped operating member, and being rotationally mounted on said one end of said receptacle;

said chamber being movable together with the operating member between a first position providing a passage communicating with one of said compartments of the receptacle, and a second position closing said passage and opening said chamber to the atmosphere;

a cover secured to said receptacle and being arranged on the side of said receptacle opposing to said operating member; and a closure of sufficient size to seal said chamber opening against the atmosphere when the chamber is not in the second position, said apparatus further comprising an opening in said receptacle and an opening in said closure, and in which said chamber contains a first opening communicating with said receptacle opening when said chamber is in said first position, and a second opening communicating with said closure opening when said chamber is in said second position;

wherein said one end of the receptacle comprises a ring-shaped projecting part for rotatably mounting said operating member, and said operating member comprises two concentric walls for defining said chamber.

6. Apparatus in accordance with claim 1, 3 or 5 in which said operating member is movable by rotation with respect to said receptacle; in which said operating member is ring-shaped, said operating member comprising:

a disc, two cylindrical walls coaxial with the axis of rotation and projecting from said disc, and two walls radiating from said axis; and said closure covers the cylindrical walls of the operating member.

7. Apparatus in accordance with claims 1, 3, or 5 in which said operating member is movable by rotation with respect to said receptacle; in which said operating member comprises said chamber being defined by:

a disc;

two cylindrical walls projecting from the disc and being coaxial with the axis of rotation, and two walls radiating from said axis between said cylindrical walls; and said closure covering the cylindrical walls and being secured on a connecting member protruding from said receptacle and lying coaxial within said cylindrical walls.

8. Apparatus in accordance with claims 1, 3 or 5, in which said receptacle comprises a bottom with an opening to provide a passage communicating between said chamber and said one compartment.

9. Apparatus in accordance with claims 1, 3 or 5 in which said receptacle is formed by a cylindrical wall and is divided into a plurality of compartments by intersecting walls.

* * * * *